(12) United States Patent
Nomiyama et al.

(10) Patent No.: US 8,979,064 B2
(45) Date of Patent: Mar. 17, 2015

(54) POSITIONER

(71) Applicant: Azbil Corporation, Tokyo (JP)

(72) Inventors: Takashi Nomiyama, Tokyo (JP); Masaki Namikawa, Tokyo (JP)

(73) Assignee: Azbil Corporation, Tokyo (JP)

( * ) Notice: Subject to any disclaimer, the term of this patent is extended or adjusted under 35 U.S.C. 154(b) by 35 days.

(21) Appl. No.: 13/912,660

(22) Filed: Jun. 7, 2013

(65) Prior Publication Data

US 2013/0327425 A1   Dec. 12, 2013

(30) Foreign Application Priority Data

Jun. 8, 2012 (JP) ................................ 2012-131255

(51) Int. Cl.
*F16K 31/02* (2006.01)
*F16K 37/00* (2006.01)
*F16K 31/12* (2006.01)
*F16K 31/36* (2006.01)

(52) U.S. Cl.
CPC ............. *F16K 37/00* (2013.01); *F16K 37/0066* (2013.01); *F16K 37/0075* (2013.01)
USPC ..................................... 251/129.04; 137/488

(58) Field of Classification Search
CPC .......................... F16K 37/0075; F16K 37/0066
USPC .................. 251/129.04; 137/487.5, 488, 487; 700/282
See application file for complete search history.

(56) References Cited

U.S. PATENT DOCUMENTS

| | | | |
|---|---|---|---|
| 5,549,137 A | 8/1996 | Lenz et al. | |
| 5,558,115 A | 9/1996 | Lenz et al. | |
| 5,573,032 A | 11/1996 | Lenz et al. | |
| 5,758,686 A * | 6/1998 | Ohtsuka et al. | 137/492.5 |
| 6,155,283 A * | 12/2000 | Hansen et al. | 137/1 |
| 2002/0040284 A1* | 4/2002 | Junk | 702/189 |
| 2011/0240891 A1* | 10/2011 | Inagaki | 251/30.01 |
| 2012/0248356 A1* | 10/2012 | Okuda et al. | 251/129.15 |

FOREIGN PATENT DOCUMENTS

| | | |
|---|---|---|
| JP | 3595554 B2 | 12/2004 |
| WO | 95/06276 A1 | 3/1995 |

* cited by examiner

*Primary Examiner* — John Rivell
*Assistant Examiner* — Josephine Trinidad-Borges
(74) *Attorney, Agent, or Firm* — Troutman Sanders LLP

(57) ABSTRACT

A positioner includes a shift magnitude calculating portion that calculates a shift magnitude from the equilibrium state of a pilot relay, from an input air pressure that is inputted into the pilot relay and an output air pressure that is outputted from the pilot relay. A control calculating portion determines a control signal from an actual opening signal, an opening setting value, and the shift magnitude from the equilibrium state of the pilot relay that is calculated by the shift magnitude calculating portion, and outputs it to the electropneumatic converter.

1 Claim, 4 Drawing Sheets

POSITIONER

CROSS REFERENCE TO RELATED APPLICATION

This application claims priority to Japanese Patent Application No. 2012-131255, filed on Jun. 8, 2012, the entire content of which being hereby incorporated herein by reference.

FIELD OF TECHNOLOGY

The present invention relates to a positioner for controlling the opening of a valve.

BACKGROUND

Conventionally, positioners for controlling the openings of valves have been, for example, positioners wherein the critical components have been configured as illustrated in FIG. 3. In this figure, 200 (200A) is a positioner, and 300 is a valve, where the valve 300 is provided with a position sensor 10 for detecting a position that indicates the degree of opening of the valve.

The positioner 200A is provided with an electric current-SP converting portion 1, a control calculating portion 2, an electropneumatic converter 3, a pilot relay 4, and a valve opening calculating portion 5.

In the positioner 200A, the electric current-SP converting portion 1 converts into an opening setting signal SP an input signal that is sent, as a signal of between 4 and 20 mA, from a higher level device. The valve opening calculating portion 5 calculates the current valve opening of the valve 200A from the position that indicates the opening of the valve, detected by the position sensor 10, and outputs, as an actual opening signal PV, a signal depending on the calculated opening. The control calculating portion 2 calculates the difference between the opening setting signal SP from the electric current-SP converting portion 1 and the actual opening signal PV from the valve opening calculating portion 5, and outputs, as a control signal MV, an electric signal obtained through performing PID control calculations on the difference.

The electropneumatic converter 3 converts into an air pressure (a nozzle back pressure) Pn the control signal MV from the control calculating portion 2. The pilot relay 4 uses the pneumatic signal Pn from the electropneumatic converter 3 as an input air pressure and amplifies this input air pressure Pn to produce an output air pressure Po, and outputs it to the operating device 11 of the valve 300. Doing so causes the air of the air pressure Po to flow into a diaphragm chamber within the operating device 11, to adjust the opening of the valve portion 12.

In this positioner 200A, that which is subject to control by the control calculating portion 2 includes the electropneumatic converter 3 and the pilot relay 4, which apply the air flow rate and the air pressure to the valve 300. If the characteristics of the electropneumatic converter 3 and the pilot relay 4 were linear, and were well-behaved characteristics, then such a control method would be adequate; however, in practice both the electropneumatic converter and the pilot relay 4 have non-linear elements such as hysteresis and a dead band, and so control is complex. Given this, because in the positioner 200A the feedback information is only the actual opening signal PV of the valve 300, if a change does not appear in the actual opening signal PV, then there is no change in the control output (the control signal MV). Because of this, controllability is a problem. Given this, a positioner with improved controllability has been proposed in Japanese Patent 3595554 ("the JP '554").

FIG. 4 is a diagram illustrating schematically the positioner shown in the JP '554. In this positioner 200 (200B), the differential value dPo/dt of the output air pressure Po that is outputted from the pilot relay 4, as a pressure differential value, is fed back to the control calculating portion 2 in addition to the actual opening signal PV that indicates the current degree of opening of the valve 300. The output air pressure Po changes more rapidly than the actual opening signal PV. Because of this, feeding back the magnitude of change of the output air pressure Po makes it possible to estimate, in advance, the change that will occur in the actual opening signal PV. This enables superior control when compared to that of feeding back only the opening information.

However, in the positioner 200B disclosed in the JP '554, even though the differential information for the output air pressure Po (the control pressure for the diaphragm portion of the operating device 11) of the pilot relay 4, wherein the response is faster than that of the actual opening of the valve 300, is fed back, when there is a noise, and the like, in the differential information, the output becomes extremely large. Because of this, there is a problem in that the control tends to become unstable.

The present invention was created in order to solve the problem as set forth above, and an aspect thereof is to provide a positioner that improves substantially responsiveness without a loss of settling performance in control.

SUMMARY

In order to achieve the aspect set forth above, the present invention is a positioner including a control calculating portion that inputs an opening setting signal for a valve, sent from a higher level device, and an actual opening signal that indicates the current degree of opening of the valve, to produce a control signal from the opening setting signal and the actual opening signal, an electropneumatic converter that converts the control signal from the control calculating portion into an air pressure, and a pilot relay that uses, as an input air pressure, the air pressure converted by the electropneumatic converter, to amplify the input air pressure to produce an output air pressure, to output to driving unit that drives the valve. The positioner further includes a shift magnitude calculating portion that calculates a shift magnitude from the equilibrium state of the pilot relay from the input air pressure that is inputted into the pilot relay and the output air pressure that is outputted from the pilot relay. The control calculating unit determines the control output to the electropneumatic converter from the actual opening signal, the opening setting signal, and the shift magnitude from the equilibrium state of the pilot relay.

While the output air pressure of the pilot relay is determined in response to the input air pressure, when there has been a change in the input air pressure from the equilibrium state, there will be a delay until the output air pressure response. In the present invention a magnitude of shift from the equilibrium state of the pilot relay is calculated from the input air pressure that is inputted into the pilot relay and the output air pressure that is outputted from the pilot relay, to determine the control output to the electropneumatic converter by taking into consideration the magnitude of shift from the equilibrium state of the pilot relay, that is, prior to the actual change, the magnitude of change in the output air pressure, which changes in response to a change in the input air pressure into the pilot relay, is estimated in advance, to thereby improve the responsiveness without a loss of settling performance in control.

For example, in the present invention the magnitude of shift from the equilibrium state of the pilot relay is calculated as Po−(K·Pn−F). Here Pn is the input air pressure that is inputted into the pilot relay, Po is the output air pressure, F is the force required before Po starts to change, and K is dPo/dPn.

In the present invention a magnitude of shift from the equilibrium state of the pilot relay is calculated from the input air pressure that is inputted into the pilot relay and the output air pressure that is outputted from the pilot relay, the control calculating portion determines, and outputs as a control signal to the electropneumatic converter, a control output from the actual opening signal, the opening setting signal, and the magnitude of shift from the equilibrium state of the pilot relay, and thus prior to the actual change, the magnitude of change in the output air pressure, which changes in response to a change in the input air pressure into the pilot relay, is estimated in advance, to thereby improve the responsiveness without a loss of settling performance in control.

DETAILED DESCRIPTION

Figure 1:
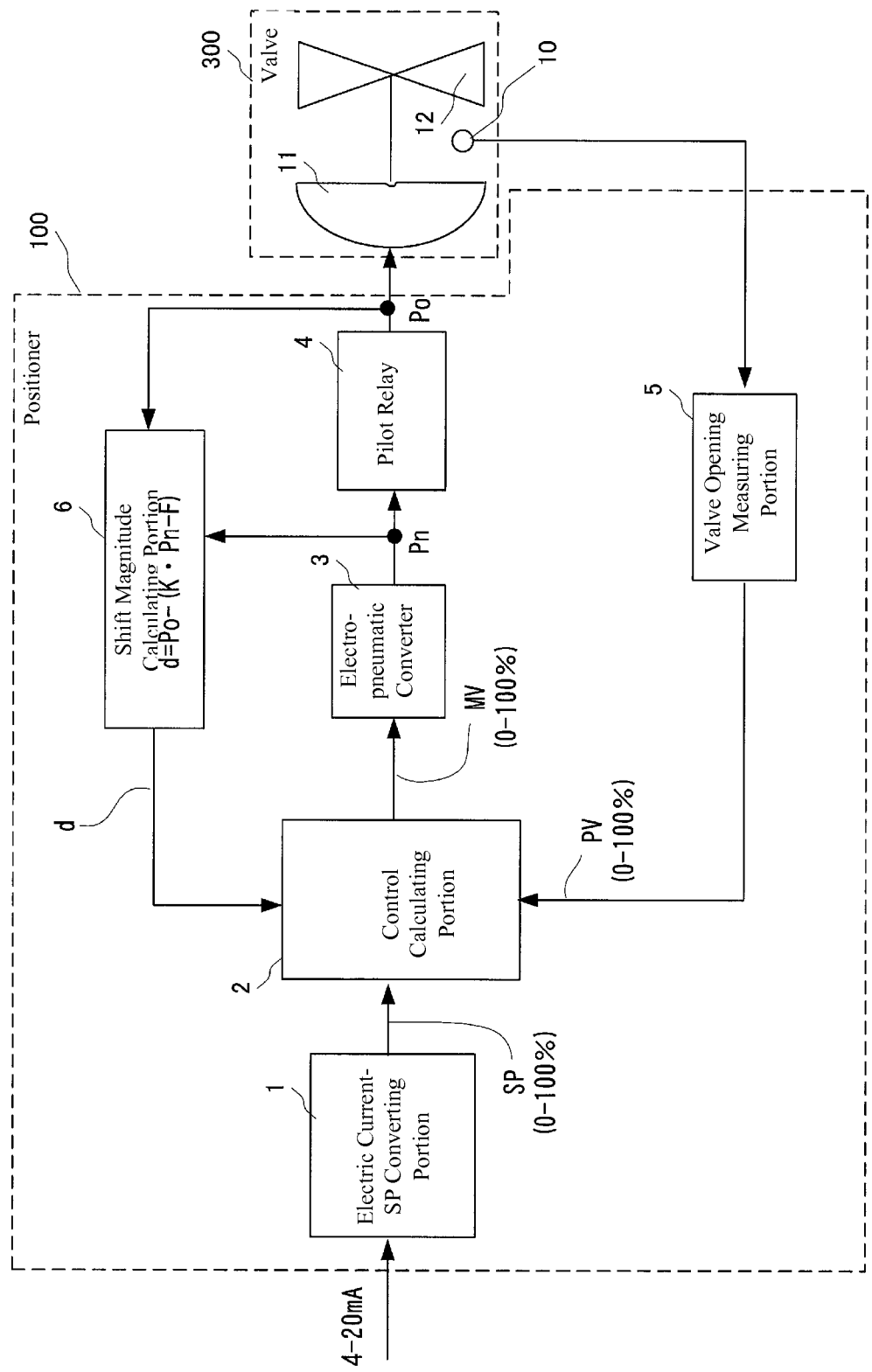
FIG. 1 is a diagram illustrating the configuration of the critical portions in an example of a positioner according to the present invention.
Figure 3:
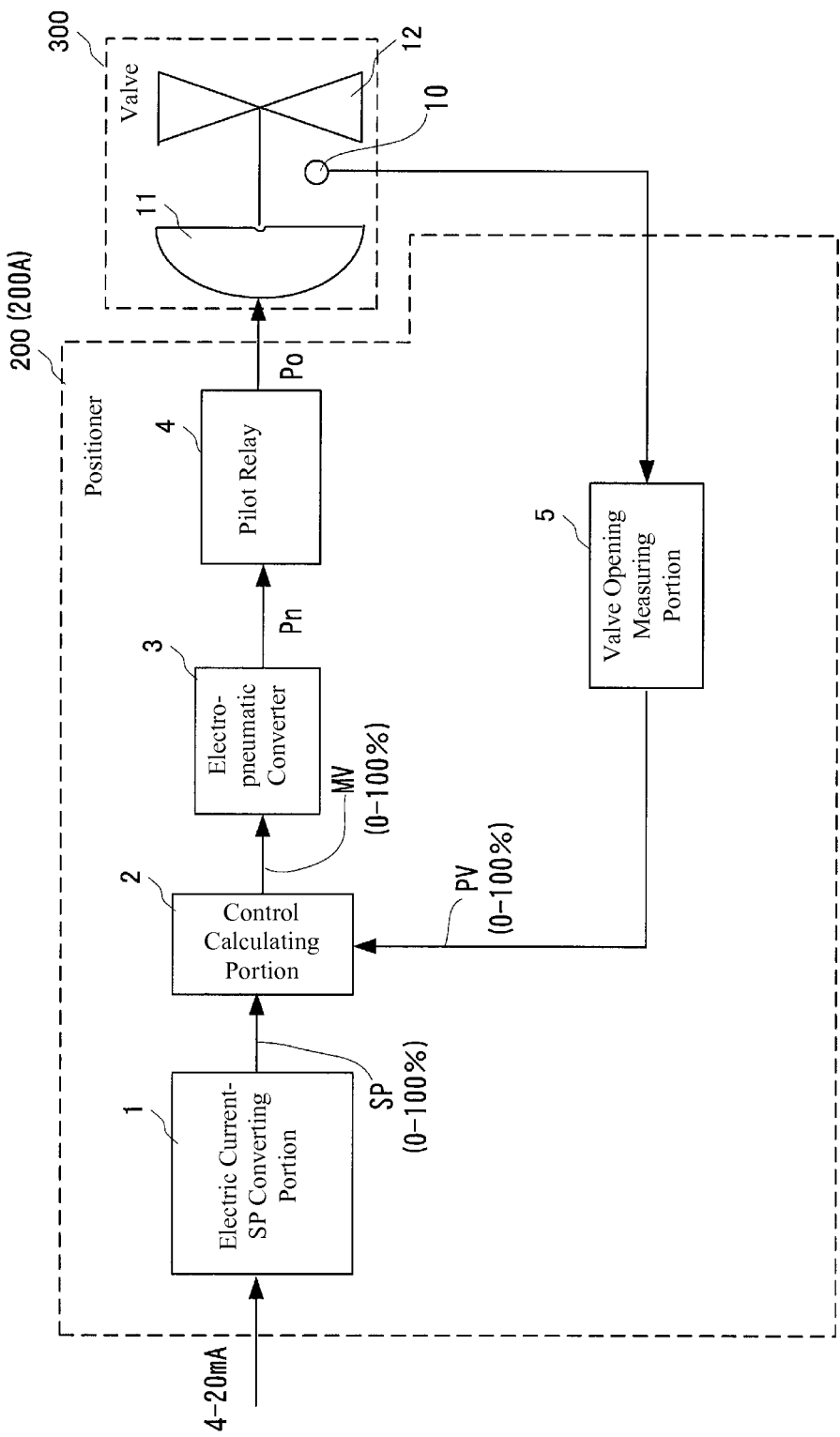
FIG. 3 is a diagram illustrating the critical components in a conventional positioner.
Figure 4:
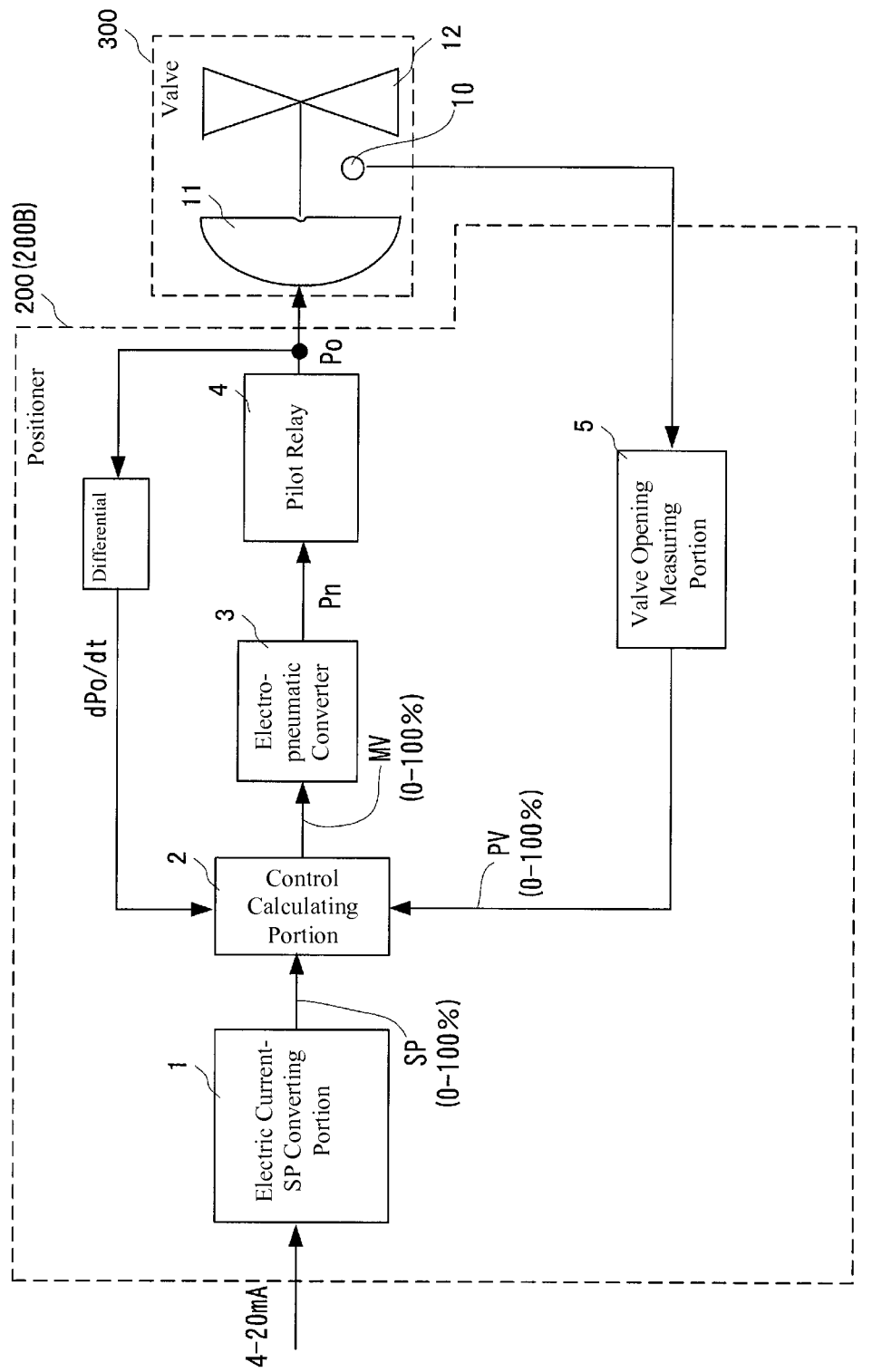
FIG. 4 is a diagram illustrating the critical components in the positioner shown in the JP '554.

An example according to the present invention will be explained below in detail, based on the drawings. FIG. 1 is a diagram illustrating the configuration of the critical portions in an example of a positioner according to the present invention. In this figure, codes that are the same as those in FIG. 3 indicate identical or equivalent structural elements as the structural elements explained in reference to FIG. 3, and explanations thereof are omitted. The positioner according to the present invention will be indicated by the code 100 in order to differentiate from a conventional positioner.

In the present example, the positioner 100 is provided with a shift magnitude calculating portion 6 for calculating the magnitude of shift d from the equilibrium state of the pilot relay 4 from the input air pressure Pn that is inputted into the pilot relay 4, and the output air pressure Po that is outputted from the pilot relay 4. It also is provided with a function for determining the control signal MV from the shift magnitude d from the equilibrium state of the pilot relay 4, calculated by the shift magnitude calculating portion 6, and outputting it to the electropneumatic converter 3.

The shift magnitude calculating portion 6 calculates the magnitude of shift d from the equilibrium state of the pilot relay 4 using the calculating equation given in Expression (1), below, from the input air pressure Pn that is inputted into the pilot relay 4 and the output air pressure Po that is outputted from the pilot relay 4.

$$d = Po - (K \cdot Pn - F) \quad (1)$$

Note that Pn is the input air pressure that is inputted into the pilot relay 4, Po is the output air pressure that is outputted from the pilot relay 4, F is the force required before Po starts to change, and K is dPo/dPn.

Figure 2:
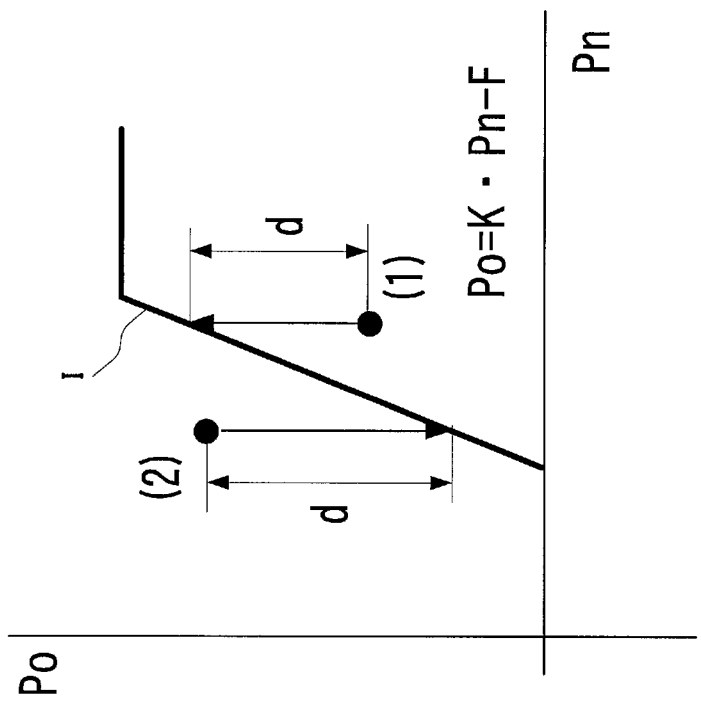
FIG. 2 is a diagram for explaining the magnitude of shift from the equilibrium status of the pilot relay, calculated by the shift magnitude calculating portion of the positioner.

The magnitude of shift d from the equilibrium state of the pilot relay 4, calculated by the shift magnitude calculating portion 6, estimates, prior to the actual change, the magnitude of change of the output air pressure Po that changes in response to a change in the input air pressure Pn that is inputted into the pilot relay 4. FIG. 2 illustrates the input/output characteristics of the pilot relay 4. The output air pressure Po of the pilot relay 4 changes in accordance with an equation expressed by Po=K·Pn−F, as indicated by the input/output characteristic I. When the relationship of the input air pressure Pn and the output air pressure Po is on this input/output characteristic I, the pilot relay 4 is in the equilibrium state.

In the equilibrium state of the pilot relay 4, the output air pressure Po assumes a value that depends on the input air pressure Pn. However, because the response of the output air pressure Po is delayed when compared to the input air pressure Pn, for some time after a change in the input air pressure Pn there will be a deviation from this input/output characteristic I. In this case, we can consider the cases wherein current output air pressure Po is such that K·Pn−F>Po and wherein the current output air pressure Po is such that K·Pn−F<Po. In the case that the current output air pressure Po is such that K·Pn−F>Po (the (1) state illustrated in FIG. 2), we can anticipate the output air pressure Po to increase by the magnitude of shift d from the equilibrium state. In the case that the current output air pressure Po is such that K·Pn−F<Po (the (2) state illustrated in FIG. 2), we can anticipate the output air pressure Po to decrease by the magnitude of shift d from the equilibrium state.

Consequently, the magnitude of shift d from the equilibrium state of the pilot relay 4 can be said to be an estimate, prior to an actual change, of the magnitude of change in the output air pressure Po that changes in response to a change in the input air pressure Pn that is inputted into the pilot relay 4. The shift magnitude d from the equilibrium state of the pilot relay 4 is calculated as Po−(K·Pn−F) in the shift magnitude calculating portion 6, and this calculated shift magnitude d is sent to the control calculating portion 2. The shift magnitude d is an estimate of the amount of change there will be in the output air pressure Po, so by feeding this back it is possible to estimate the change in opening at an earlier stage than when feeding back the amount of change in the output air pressure Po. Because of this, the controllability is improved substantially.

The control calculating portion 2 determines the control signal MV from the actual opening signal PV, the opening setting value SP, and the shift magnitude d from the equilibrium state of the pilot relay 4 that is calculated by the shift magnitude calculating portion 6, and outputs it to the electropneumatic converter 3. Note that the control signal MV is determined through Expression (2), below:

$$MV = Kp \cdot (SP - PV) + \int Ki(SP - PV)dt + Kd \cdot (dPV/dt) + Km \cdot d \quad (2)$$

Here Kp is the proportional gain, Ki is the integral gain, Kd is the differential gain, and Km is the shift magnitude gain.

Note that while in the example, set forth above, the shift magnitude d from the equilibrium state of the pilot relay 4 was calculated using Expression (1), above, there is no limitation to this expression. For example, instead the shift magnitude d from the equilibrium state of the pilot relay 4 may be read out from a table wherein the relationships in Expression (1), described above, are stored as data. Moreover, while in the examples set forth above the position sensor 10 was provided outside of the positioner 100, it may instead be provided within the positioner 100.

Furthermore, in the examples set forth above, the functions of the control calculating portion 2, the shift magnitude calculating portion 6, and the like, in the positioner 100, may be embodied through hardware that includes a processor and a storage device and a program, which operates jointly with this hardware, for achieving these functions as a controlling device.

EXTENDED EXAMPLES

While the present invention has been explained above in reference to the examples, the present invention is not limited to the examples set forth above. The structures and details in the present invention may be varied in a variety of ways, as can be understood by one skilled in the art, within the scope of technology in the present invention.

The invention claimed is:

1. A positioner comprising:

a control calculating portion that inputs an opening setting signal for a valve, sent from a higher level device, and an actual opening signal that indicates the current degree of opening of the valve, to produce a control signal from the opening setting signal and the actual opening signal;

an electropneumatic converter that converts the control signal from the control calculating portion into an air pressure;

a pilot relay that uses, as an input air pressure, the air pressure converted by the electropneumatic converter, to amplify the input air pressure to produce an output air pressure, and to output to a driving unit that drives the valve; and a shift magnitude calculating portion that calculates a shift magnitude from the equilibrium state of the pilot relay, from the input air pressure that is inputted into the pilot relay and the output air pressure that is outputted from the pilot relay, wherein the control calculating portion determines the control output to the electropneumatic converter from the actual opening signal, the opening setting signal, and the shift magnitude from the equilibrium state of the pilot relay, and wherein the shift magnitude calculating portion calculates the shift magnitude from the equilibrium state of the pilot relay as Po−(K·Pn−F), wherein:

Pn is the input air pressure that is inputted into the pilot relay,

Po is the output air pressure that is outputted from the pilot relay,

F is the force required before Po starts to change, and

K is dPo/dPn.

* * * * *